(12) United States Patent
Cheng

(10) Patent No.: US 6,336,517 B1
(45) Date of Patent: Jan. 8, 2002

(54) RELEASABLY ATTACHED CART CHASSIS

(75) Inventor: Larry M. Cheng, Taichung (TW)

(73) Assignee: Merits Health Products Co., Ltd., Taichung (TW)

( * ) Notice: Subject to any disclaimer, the term of this patent is extended or adjusted under 35 U.S.C. 154(b) by 0 days.

(21) Appl. No.: 09/711,146

(22) Filed: Nov. 14, 2000

(51) Int. Cl.⁷ .............................................. B62D 61/00
(52) U.S. Cl. ...................... 180/208; 180/65.1; 280/785; 403/321
(58) Field of Search ................................ 180/208, 227, 180/908, 907, 65.1; 280/DIG. 5, 785, 287, 292, 32.5; 403/321, 322.1, 322.3, 322.4

(56) References Cited

U.S. PATENT DOCUMENTS

| | | | | |
|---|---|---|---|---|
| 3,266,589 A | * | 8/1966 | Harris | 180/208 |
| 3,388,761 A | * | 6/1968 | Arpin | 180/208 |
| 4,750,578 A | * | 6/1988 | Brandenfels | 180/208 |
| 4,944,359 A | * | 7/1990 | Doman et al. | 180/208 |
| 5,074,372 A | * | 12/1991 | Schepis | 180/208 |
| 5,101,920 A | * | 4/1992 | Peterson | 180/208 |
| 5,154,251 A | * | 10/1992 | Fought | 180/208 |
| 5,382,110 A | * | 1/1995 | Perotto et al. | 403/322.3 |
| 5,503,243 A | * | 4/1996 | Kruse | 180/208 |
| 5,593,168 A | * | 1/1997 | Chou | 280/287 |
| 5,941,327 A | * | 8/1999 | Wu | 180/65.1 |
| 6,135,668 A | * | 10/2000 | Lin | 403/322.4 |
| 6,149,170 A | * | 11/2000 | Dotson | 280/87.021 |
| 6,203,236 B1 | * | 3/2001 | Gautier et al. | 403/322.1 |

* cited by examiner

Primary Examiner—Lanna Mai
Assistant Examiner—Ruth Ilan
(74) Attorney, Agent, or Firm—Rosenberg, Klein & Lee

(57) ABSTRACT

The present invention provides a chart chassis composed of a front and a rear cart frameworks bridged together, while the releasing and assembling mechanism comprises a handle bar, a turnable member and a joint assembly. By pulling the handle bar to turn the turnable member outwards, and separating the joint assembly from the turnable member thereby performing instant detachment of the cart chassis.

8 Claims, 6 Drawing Sheets

RELEASABLY ATTACHED CART CHASSIS

BACKGROUND OF THE INVENTION

1. Field of the Invention

The present invention relates to releasably attached cart chassis, and more particularly, to a chassis of an electric chart constructed such that it can be conveniently detached and re-assembled.

2. Description of the Prior Art

For the convenience of storing or transporting, an electric cart is usually constructed such that it is releasable in several portions so as to minimize its size, the releasable portions are, for example, the steering wheel, the seat, and the chassis etc., among them releasing the chassis is most effective in reducing the size of a cart.

Generally, the chassis of an electric cart is composed of a front cart framework and a rear cart framework, the two frameworks are engaged with a plurality of screw bolts and nuts so that a set of auxiliary hand tools are necessary for releasing and re-assembling the chassis by loosening and tightening those screw elements therefore causing the following shortcomings:

1. A lot of screw fixing elements used for engagement causes time consuming releasing and re-assembling work.

2. A set of auxiliary hand tools are necessary to be carried along with the detached cart during transportation in order to re-assemble it when it arrives at the destination, which is quite bothersome and inconvenient.

SUMMARY OF THE INVENTION

Aiming at the above depicted disadvantages, the present invention is to propose a newly developed construction of releasably attached cart chassis capable of conveniently and effectively assembling or detaching.

It is another object of the present invention to provide a releasably attached cart chassis which can be firmly assembled without using auxiliary hand tools.

For achieving the above mentioned object, the present invention provides a cart chassis composed of a front cart framework and a rear cart framework bridged together, while the releasing and assembling mechanism comprises a handle bar, a turnable member and a joint assembly. By pulling the handle bar to turn the turnable member outwards, and separating the joint assembly from the turnable member thereby performing instant detachment of the cart chassis.

For fuller understanding of the nature and objects of the invention, reference should be made to the following detailed description taken in conjunction with the accompanying drawings.

DETAILED DESCRIPTION OF THE PREFERRED EMBODIMENT

Figure 1:
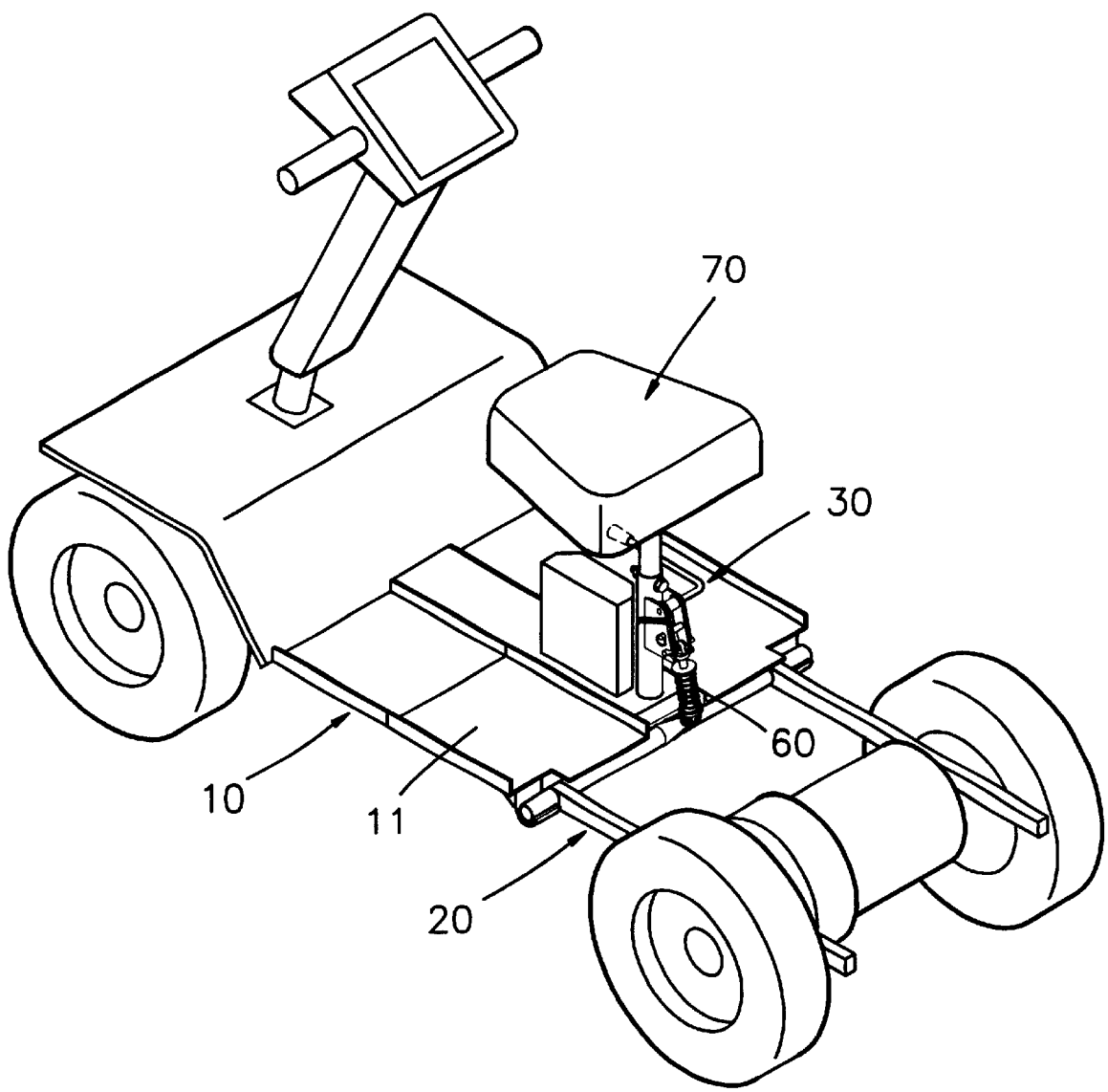
FIG. 1 is a three dimensional perspective view of a cart with releasably attached cart chassis of the present invention.
Figure 2:
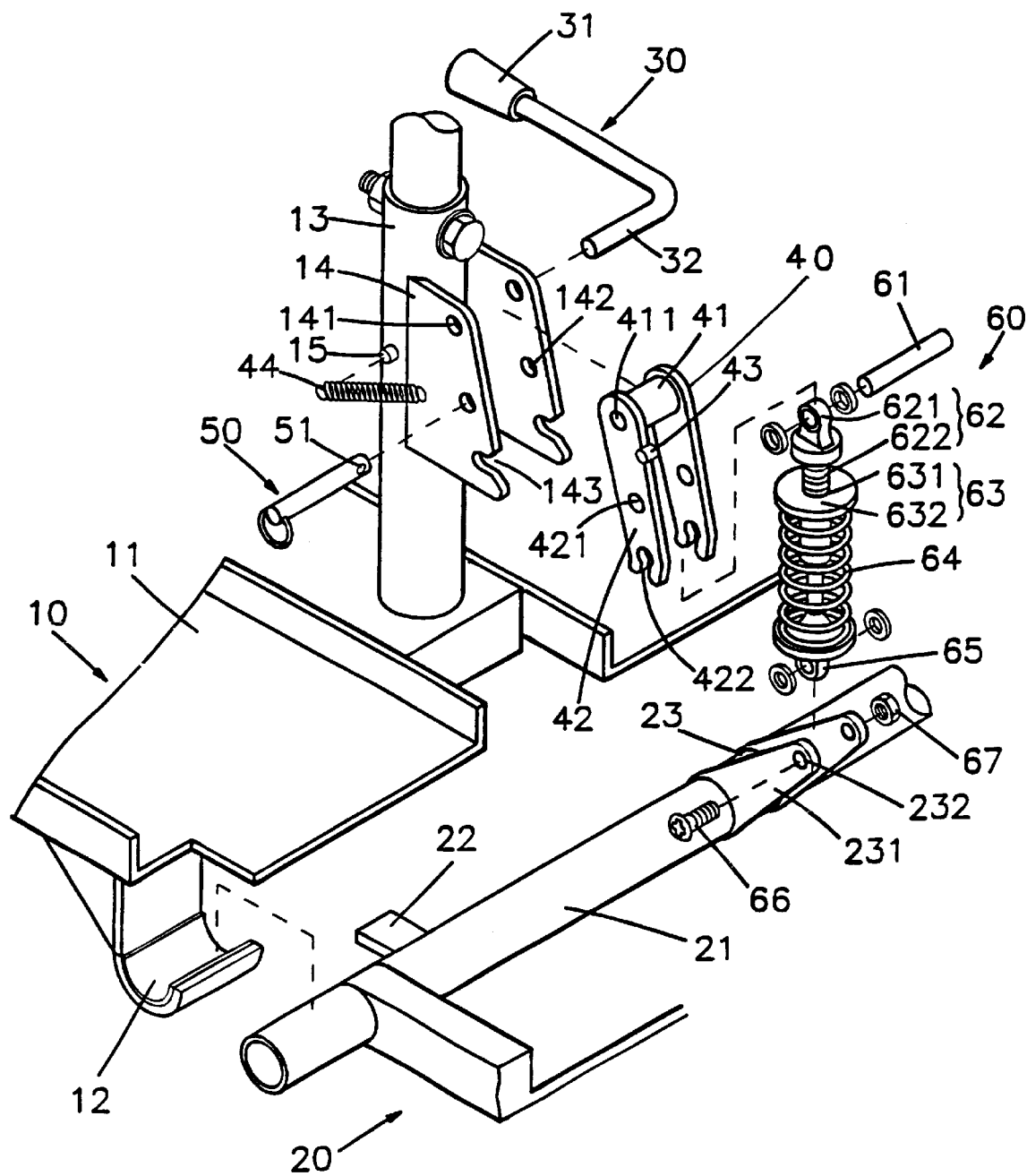
FIG. 2 is an exploded view showing each component of the present invention.
Figure 3:
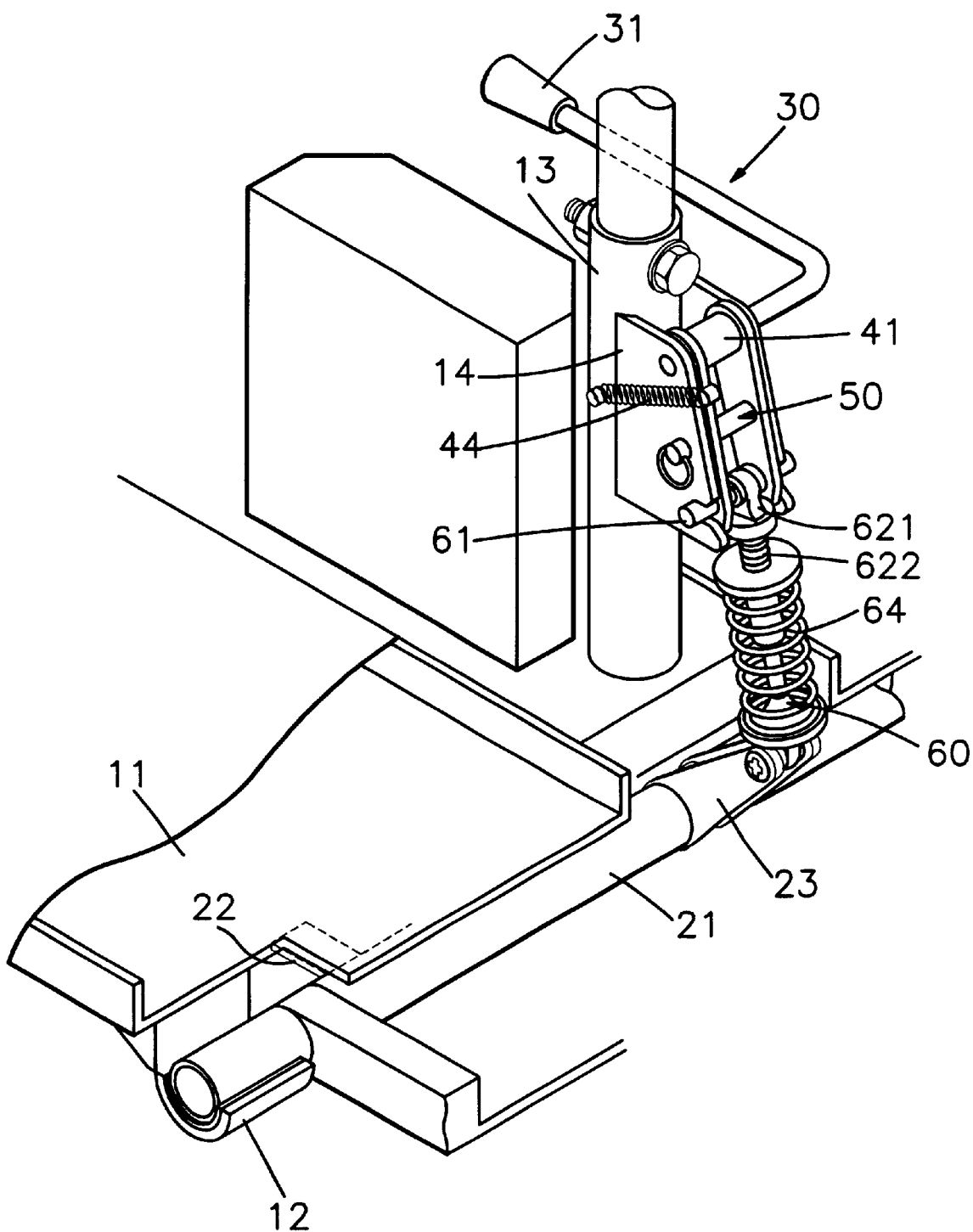
FIG. 3 is an assembled three dimensional view of the present invention.

Referring to FIGS 1 through 3, the cart chassis of the present invention is composed of a front cart framework 10 and a rear cart framework 20 bridged together, whereas the releasable attachment mechanism comprises a handle bar 30, a turnable member 40, a fixing pin 50, and a joint assembly 60.

The front cart framework 10 has a base plate 11, the base plate 11 has two end supporting brackets 12 each formed into a top opened arcuate shape. A post 13 stands on the base plate 11 at the position between two supporting brackets 12. The post 13 is conjoined to and supports a detachable seat 70 thereon and has two parallel tail fins 14 extending backwards each equipped with a hinge hole 141, a first insertion hole 142, and a first recessed slot 143 with an opening directed backwards. There is further provided with a first hook eye 15 on the side surface of the post 13.

The rear cart framework 20 has a round connecting rod 21 lying in the transverse direction of the cart chassis with its two ends resting on the two supporting brackets 12. The two skid protrusions 22 stretched horizontally forwards are used to urge against the bottom surface of the base plate 11 for preventing relative turning of the two cart frameworks 10 and 20 when they are mutually coupled together. Incidentally, an extension adapter 23 having two parallel plates 231 is fitted at the middle of the connecting rod 23. Each plate 231 has an eyelet.

The handle bar 30 is a L shaped bar having a grip portion 31 and a crossed portion 32. The crossed portion 32 is inserted into the hinge holes 141 of both tail fins 14 such that the handle bar 30 is turnable thereof.

The turnable member 40 is disposed between the two tail fins 14. The turnable member 40 is formed of a junction block 41 and two flaps 42. The junction block 41 has a through hole 411 for the crossed portion 32 of the handle bar 30 to tunnel through and is fixed thereat. Each flap 42 has a second insertion hole 421 aligned to the first insertion hole 142, and a second recessed slot 422 whose opening is directed downward so that the first recessed slot 143 and the second recessed slot 422 are mated with each other to form a round confinement space when the front and the second cart frameworks 10 and 20 are coupled together.

Meanwhile, a second hook eye 43 is formed on one of the flap 42, and a coil spring 44 is hooked its two ends respectively on the first and the second hook eyes 15, 43 thereby causing the turnable member 40 only able to swing to one side.

The fixing pin 50, formed into a slender cylindrical shape and tunneling through the first and the second insertion holes 142, 421, has a steel ball 51 inlaid in its end thereof. The steel ball 51 is urged by a spring (not shown) and slightly emerging from the side surface of the fixing pin 50. When the fixing pin 50 conjoins the tail fins 14 and the turning member 40 together, the turning member 40 is tightly confined between the two tail fins 14 with the aid of the steel ball 51 strongly urging on the outer surface of one of the tail fins 14 without the fear of loosening.

The joint assembly 60 includes a stopper pin 61, a screw bolt 62, a nut collar 63, a vibration damper spring 64, and a hinged joint 65 provided at the bottom of the nut collar 63.

The stopper pin 61 is transversely penetrating through the top portion 621 of the screw bolt 62, and its two ends are settled in the second recessed slots 422 so that when the two pairs of recessed slots 143 and 422, are coupled together the stopper pin 61 is stably confined in the confinement space formed therebetween. The threaded portion 622 of the screw bolt 62 is engaged to a screw hole 631 formed in the nut collar 63, and the spring 64 is clad over the nut collar 63 with its top end urging against a flat bottom surface 632 of the nut collar 63.

Figure 4:
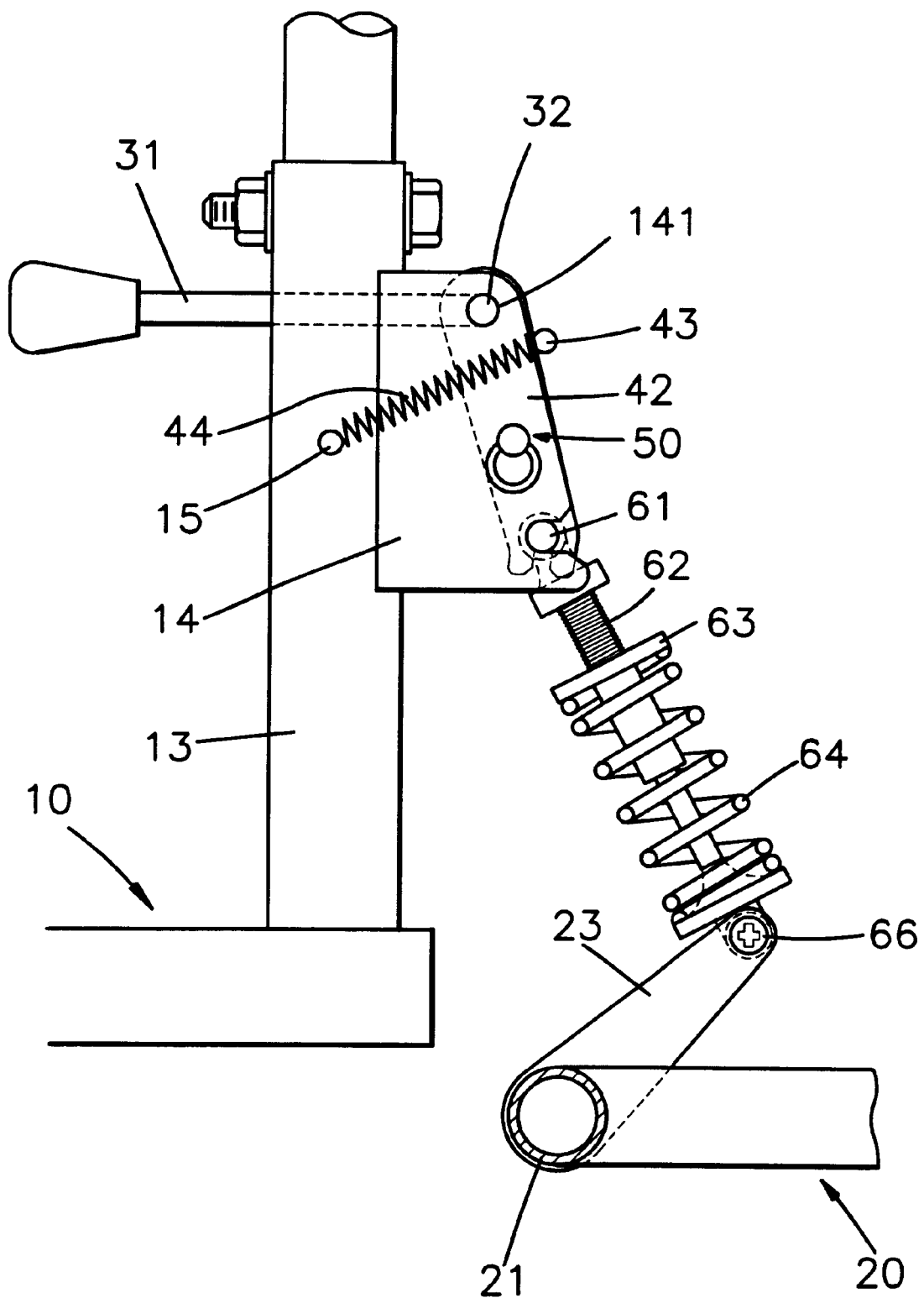
FIG. 4 is a view showing that the front and the rear cart frameworks are engaged together by the turnable member and the joint assembly.

Meanwhile, the hinged joint 65 is formed into a through hole for a screw pin 66 to pass therethrough and the eyelet 232 of the adapter 23 as well, and then is tightened with a nut 67 so as to reliably combine the front and the rear cart frameworks 10 and 20 together by means of the hinged joint 65 and the stopper pin 61 as shown in FIG. 4.

Now, the operation procedures of detaching and assembling the chassis will be illustrated hereinafter As shown in FIG. 4, the two cart frameworks 10 and 20 are combined together where the grip portion 31 of the handle bar 30 is horizontally disposed and the fixing pin 50 is tunneling through the first and the second insertion holes 142 and 421 thereby firmly sandwiching the turning member 40 between two fins 14. In addition, the chassis is further stably assembled because vibration force which is transferred from the front cart framework 10 is absorbed by the vibration damper spring 64.

Figure 5:
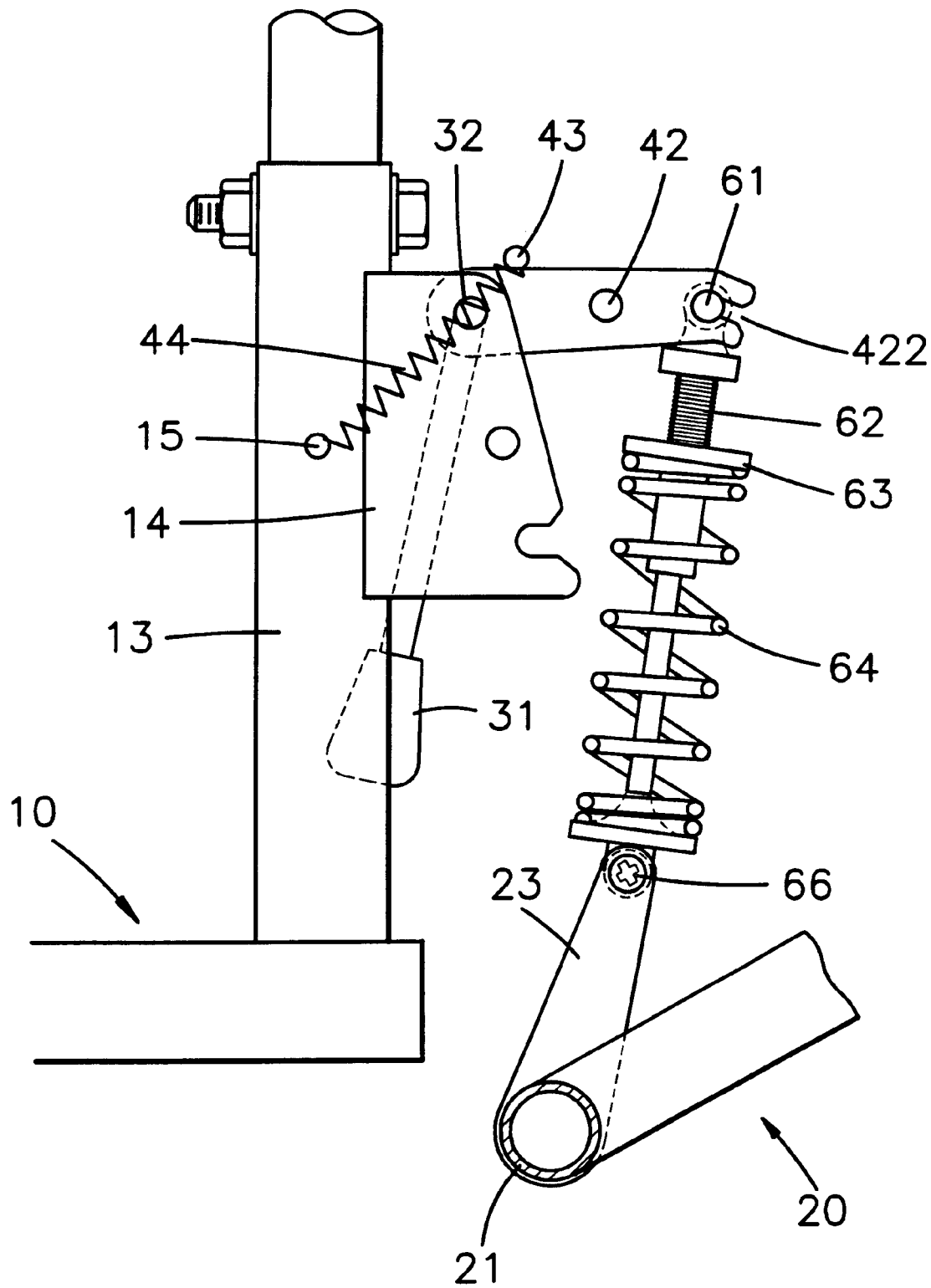
FIG. 5 is a view showing that the rear cart framework is on the way of being detached from the front cart framework.
Figure 6:
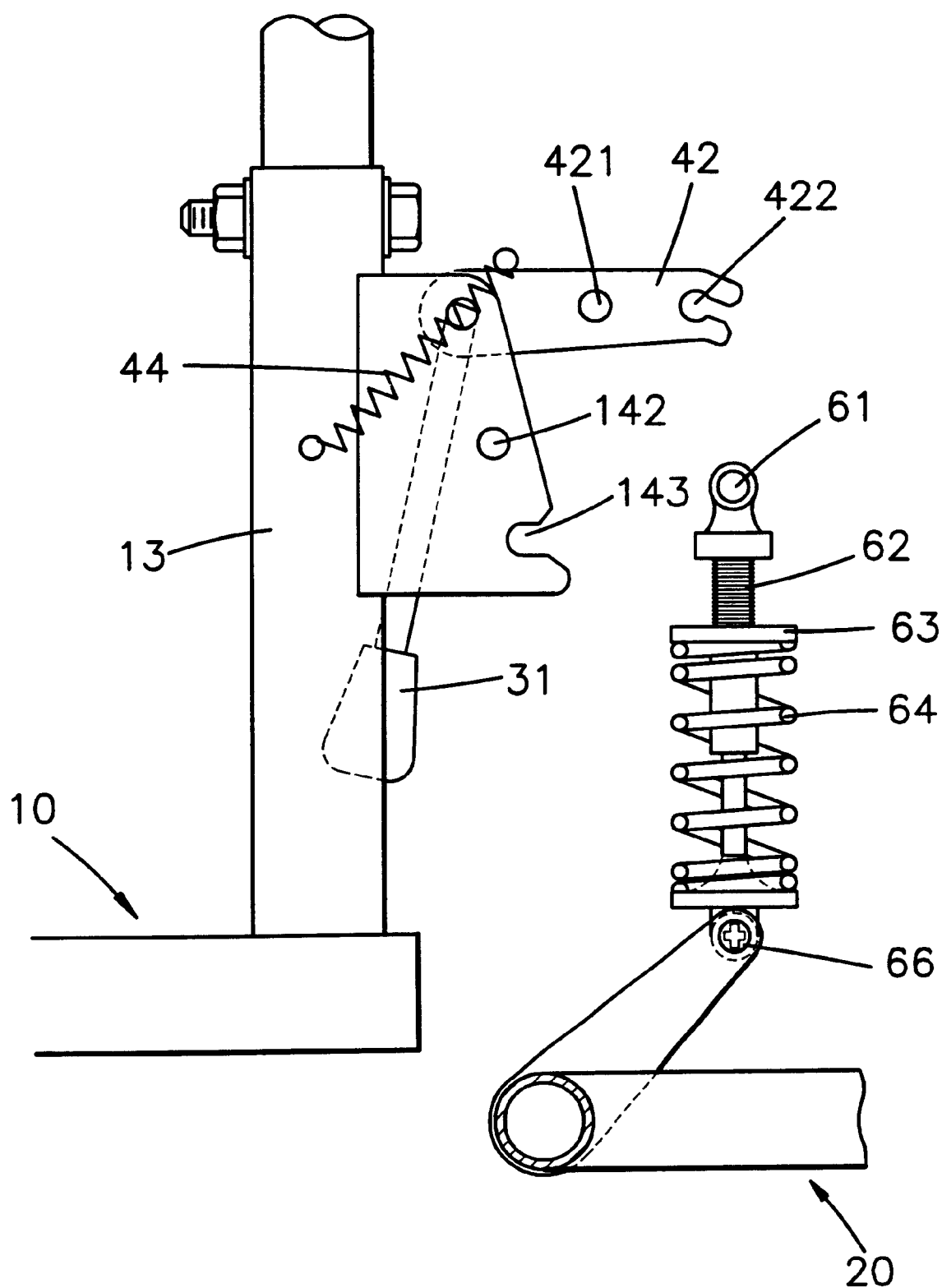
FIG. 6 is a view showing that the front and the rear cart frameworks are completely separated from each other.

Referring to FIG. 5, in releasing the attachment between the two cart frameworks 10 and 20, at first, extracting the fixing pin 50, and turning down the grip portion 31 with respect to the hinged joint 65 as a center of rotation and depending on the connecting rod 21 as a supporter. At this moment the turnable member 40 which follows the movement of the handle bar 30, turns outwards and upwards with respect to the center axis passing the through hole 411 of the junction block 41, and simultaneously, the second recessed slot 422 of the turnable member 40 displaces along with the stopper pin 61 of the joint assembly 60, finally, by extracting the stopper pin 61 from the second recessed slot 422, the front and the rear cart frameworks 10 and 20 will be easily separated as shown in FIG. 6.

Assembling of the two car frameworks 10 and 20 may be executed by steps in reversed order described above.

After having finished reading over the above detailed description of the present invention, one may clearly understand that the present invention has several features which are distinctly superior to any other conventional technique, and are as follows:

1. In assembling the chassis of the present invention, no additionally provided connecting or linking components such as screw bolts and nuts are required.

2. In releasing the chassis of the present invention, no auxiliary hand tools are required.

3. By adjusting the insertion depth of the screw bolt 62 in the nut collar 63, the vibration damping effect of the spring 64 can be predetermined at a desired degree.

Those who are skilled in the art will readily perceive how to modify the invention. Therefore, the appended claims are to be construed to cover all equivalent structures which fall within the true scope and spirit of the invention.

What is claimed is:

1. A releasably attached cart chassis comprising:

a front cart framework having a base plate with two supporting brackets, one on each of two sides of said base plate, a post standing on said base plate between said two supporting brackets, said post having two tail fins extending backwards, each being equipped with a hinge hole, a first insertion hole, and a first recessed slot with an opening;

a rear cart framework releasably attached to said front cart framework and including a connecting rod, said connecting rod having two ends resting on said two supporting brackets, said rear cart framework further having at least one skid protrusion extending horizontally forwards for urging against the bottom surface of said base plate, and an extension adapter fitted to said connecting rod;

a handle bar having a crossed portion which is inserted into said hinge holes of said both tail fins such that said handle bar is turnable;

a turnable member engaged to said crossed portion and disposed between said two tail fins, said turnable member having at least one second insertion hole and at least one second recessed slot with an opening so that said first and said second recessed slots are mated with each other to form a confinement space when said front and said rear cart frameworks are coupled together;

a fixing pin inserted through the first and the second insertion holes so as to tightly sandwich said turning member between said two tail fins; and a joint assembly including a stopper pin and a hinged joint, said stopper pin confined in the space formed by said first and said second recessed slots, and said hinged joint engaged to said extension adapter of said connecting rod; and wherein said front and said rear cart frameworks can be released from or conjoined to each other by operating said handle bar.

2. The cart chassis of claim 1, wherein said turnable member is formed of a junction block and two flaps, said junction block has a through hole for said crossed portion of said handle bar to be inserted in and be fixed thereat, while said second insertion hole and said second recessed slot arc formed on each of said flaps.

3. The cart chassis of claim 2, wherein said first recessed slot formed on the lower portion of each of said tail fins has an opening directed backwards, while said second recessed slot formed on the lower portion of each of said flaps has an opening directed downwards so that when said first and said second recessed slots are mated with each other, said confinement space is formed therebetween.

4. The cart chassis of claim 1, wherein said post is provided with a first hook eye, and said turnable member is provided with a second hook eye, and a coil spring hooks its two ends respectively on said first and said second hook eyes thereby causing said turnable member to only be able to swing to one side.

5. The cart chassis of claim 1, wherein said supporting bracket of said front cart framework is formed into a top opened arcuate shape.

6. The cart chassis of claim 1, wherein said joint assembly further includes a screw bolt, a nut collar, and a vibration damper spring, wherein the top portion of said screw bolt is engaged with said stopper pin penetrating therethrough, while the lower portion of said screw bolt is screw engaged to a screw hole formed in said nut collar, and said vibration damper spring is clad over said nut collar with its top end urging against a flat bottom surface of said nut collar.

7. The cart chassis of claim 6, wherein the hinged end of said nut collar is a hinged joint formed into a through hole, and said extension adapter fitted to said connecting rod has two parallel plates, each plate has an eyelet, a screw pin passed through said eyelet and said hinged joint hole thereby engaging said nut collar and said adapter.

8. The cart chassis of claim 1, wherein said fixing pin has a steel ball inlaid in its end thereof, which is urged by a spring and slightly emerging from the side surface of said fixing pin thereby ensuring stable and reliable engagement of said fixing pin.

* * * * *